US010032353B2

(12) United States Patent
Baczuk et al.

(10) Patent No.: US 10,032,353 B2
(45) Date of Patent: Jul. 24, 2018

(54) MONITORING DEPENDENT INDIVIDUALS

(71) Applicant: KiLife Tech, Inc., Orem, UT (US)

(72) Inventors: Jordan Baczuk, Orem, UT (US);
Spencer Behrend, Orem, UT (US)

(73) Assignee: KiLife Tech, Inc., Orem, UT (US)

( * ) Notice: Subject to any disclaimer, the term of this patent is extended or adjusted under 35 U.S.C. 154(b) by 0 days.

(21) Appl. No.: 15/052,617

(22) Filed: Feb. 24, 2016

(65) Prior Publication Data

US 2016/0247378 A1     Aug. 25, 2016

Related U.S. Application Data

(60) Provisional application No. 62/120,334, filed on Feb. 24, 2015, provisional application No. 62/244,042, filed on Oct. 20, 2015.

(51) Int. Cl.
*G08B 21/02* (2006.01)
*H04W 4/00* (2018.01)
(Continued)

(52) U.S. Cl.
CPC ..... *G08B 21/0266* (2013.01); *G08B 21/0202* (2013.01); *G08B 21/0211* (2013.01);
(Continued)

(58) Field of Classification Search
CPC ................................................. G08B 21/0202
(Continued)

(56) References Cited

U.S. PATENT DOCUMENTS 6,529,131 B2 *  3/2003  Wentworth ........ G08B 21/0216
                                                       340/573.1
6,563,427 B2     5/2003  Bero et al.
(Continued)

FOREIGN PATENT DOCUMENTS

KR   1020080060507 A   6/2008
KR   1020110052832 A   5/2011
KR   1020140029371 B1  11/2014

OTHER PUBLICATIONS

International Search Report and Written Opinion for related PCT Application PCT/US2016/019378, dated May 26, 2016, pp. 1 to 17.
(Continued)

*Primary Examiner* — Steven Lim
*Assistant Examiner* — Kam Ma
(74) *Attorney, Agent, or Firm* — Pillsbury Winthrop Shaw Pittman LLP

(57) ABSTRACT

Provided is a wearable child-monitor system. the system comprises a movable peripheral device associated with a user, the movable peripheral device, comprising: one or more sensors configured to generate output signals conveying information indicating the location of the moveable device with respect to a central unit; a tangible non-transitory machine readable media storing instructions that when executed by one or more processors of the central unit effectuate operations comprising: establish wireless communication between the movable peripheral device and the central unit; define monitoring settings to monitor the location of the movable peripheral device with respect to the central unit; determine information indicating the location of the moveable peripheral device with respect to the central unit; compare the information indicating the location with the defined monitoring settings; and generate an alert responsive to the information indicating the location of the peripheral device breaching the location indicator threshold.

31 Claims, 8 Drawing Sheets

(51) Int. Cl.
  *H04W 4/02* (2018.01)
  *H04B 7/155* (2006.01)
  *H04W 4/70* (2018.01)
  *H04W 4/80* (2018.01)
  *H04B 17/27* (2015.01)
  *G08B 21/04* (2006.01)

(52) U.S. Cl.
  CPC ......... *G08B 21/0277* (2013.01); *H04B 7/155* (2013.01); *H04B 17/27* (2015.01); *H04W 4/005* (2013.01); *H04W 4/008* (2013.01); *H04W 4/023* (2013.01); *H04W 4/70* (2018.02); *H04W 4/80* (2018.02); *G08B 21/0222* (2013.01); *G08B 21/0225* (2013.01); *G08B 21/0283* (2013.01); *G08B 21/043* (2013.01); *G08B 21/0446* (2013.01)

(58) Field of Classification Search
  USPC ............ 340/539.13, 539.15, 539.21, 539.23, 340/573.1
  See application file for complete search history.

(56) References Cited

U.S. PATENT DOCUMENTS

| | | | |
|---|---|---|---|
| 6,967,562 B2 | 11/2005 | Menard et al. | |
| 7,164,354 B1* | 1/2007 | Panzer | G07C 9/00111 235/384 |
| 7,636,047 B1 | 12/2009 | Sempek | |
| 8,140,012 B1* | 3/2012 | Causey | G08B 13/1427 340/5.31 |
| 8,382,681 B2 | 2/2013 | Escutia et al. | |
| 8,529,553 B2 | 9/2013 | Mounce et al. | |
| 8,731,156 B1 | 5/2014 | White et al. | |
| 9,002,372 B2* | 4/2015 | Shakespeare | H04W 64/00 340/539.13 |
| 9,129,502 B2* | 9/2015 | Naim | G08B 21/0208 |
| 9,251,686 B1 | 2/2016 | Reich et al. | |
| 9,300,555 B2* | 3/2016 | Mukherjee | H04L 43/06 |
| 2003/0063003 A1* | 4/2003 | Bero | G08B 21/0227 340/573.1 |
| 2003/0116596 A1 | 6/2003 | Terasawa | |
| 2003/0210147 A1* | 11/2003 | Humbard | G08B 21/0202 340/573.1 |
| 2004/0021567 A1* | 2/2004 | Dunn | G01S 19/51 340/539.13 |
| 2005/0200487 A1* | 9/2005 | O'Donnell | A62B 99/00 340/573.1 |
| 2006/0074494 A1* | 4/2006 | McFarland | G05B 15/02 700/1 |
| 2006/0199534 A1* | 9/2006 | Smith | G08B 21/023 455/41.2 |
| 2008/0001814 A1* | 1/2008 | Durst | G01S 5/0027 342/357.55 |
| 2008/0055072 A1* | 3/2008 | Holoyda | G08B 21/0202 340/539.13 |
| 2008/0062120 A1* | 3/2008 | Wheeler | G08B 25/016 345/156 |
| 2008/0080719 A1* | 4/2008 | Ahn | H04M 1/6066 381/17 |
| 2010/0085193 A1* | 4/2010 | Boss | H04N 5/76 340/573.1 |
| 2010/0160744 A1* | 6/2010 | Ha | H04W 4/02 600/301 |
| 2010/0253504 A1* | 10/2010 | Lliteras | G08B 21/22 340/539.11 |
| 2010/0315242 A1* | 12/2010 | Bullard | H04L 43/065 340/584 |
| 2012/0086574 A1 | 4/2012 | Blumel et al. | |
| 2012/0092156 A1* | 4/2012 | Tran | G06F 19/3418 340/539.12 |
| 2012/0126973 A1* | 5/2012 | DeAngelis | A63B 24/0021 340/539.13 |
| 2013/0187789 A1 | 7/2013 | Lowe | |
| 2013/0257616 A1* | 10/2013 | Taylor | G08B 21/0225 340/568.2 |
| 2014/0025234 A1 | 1/2014 | Levien et al. | |
| 2014/0119312 A1* | 5/2014 | Doetsch | H04B 7/024 370/329 |
| 2014/0143785 A1 | 5/2014 | Mistry et al. | |
| 2014/0320312 A1 | 10/2014 | Sager et al. | |
| 2014/0329613 A1* | 11/2014 | Savarese | G06K 7/10366 473/222 |
| 2014/0348186 A1* | 11/2014 | Ogata | H04J 3/0641 370/508 |
| 2014/0362710 A1* | 12/2014 | Mukherjee | H04L 43/06 370/252 |
| 2015/0084769 A1 | 3/2015 | Messier et al. | |
| 2015/0131539 A1* | 5/2015 | Tsfaty | H04B 11/00 370/329 |
| 2015/0161878 A1 | 6/2015 | Eisenman | |
| 2015/0163631 A1* | 6/2015 | Quam | F24F 11/006 455/456.1 |
| 2015/0192658 A1 | 7/2015 | Ullah et al. | |
| 2015/0201846 A1* | 7/2015 | Maiershon | A61B 5/0205 600/301 |
| 2015/0247913 A1 | 9/2015 | Messier et al. | |
| 2015/0269699 A1 | 9/2015 | Burgess et al. | |
| 2015/0269824 A1 | 9/2015 | Zhang | |
| 2015/0332573 A1 | 11/2015 | Selmanovic et al. | |
| 2015/0339910 A1 | 11/2015 | Stenzler et al. | |
| 2015/0356393 A1* | 12/2015 | Daoura | G06Q 10/00 340/8.1 |
| 2015/0356848 A1 | 12/2015 | Hatch | |
| 2015/0365979 A1 | 12/2015 | Park | |
| 2016/0005304 A1 | 1/2016 | Curatolo et al. | |
| 2016/0027284 A1* | 1/2016 | Kamp | G08B 21/182 340/686.6 |
| 2016/0034696 A1 | 2/2016 | Jooste et al. | |
| 2016/0035205 A1 | 2/2016 | Messenger et al. | |
| 2016/0044521 A1* | 2/2016 | Doh | H04W 64/00 370/242 |
| 2016/0063836 A1 | 3/2016 | Fishwick | |
| 2016/0065832 A1 | 3/2016 | Kim et al. | |
| 2016/0110571 A1* | 4/2016 | Jung | G06F 21/602 340/10.1 |
| 2016/0342176 A1 | 11/2016 | Han et al. | |

OTHER PUBLICATIONS

A Billion-Dollar Bracelet Is the Key to a Disney Park, The New York Times, http://nyti.ms/1dPnL7Z, Apr. 1, 2014, pp. 1 to 4.
Keep the kids on a virtual leash, http://www.gizmag.com/mommy-im-here-virtual-child-leash/17842/, Feb. 10, 2011, pp. 1 to 4.
Keeping Kids on a Wireless Leash, Tech News World, http://www.technewsworld.com/story/51425.html, Jun. 29, 2006, pp. 1 to 3.
The Kiddo Kidkeeper Keeps Your Child on a Digital Leash, Gizmodo, http://gizmodo.com/362075/the-kiddo-kidkeeper-keeps-your-child-on-a-digital-leash, Feb. 28, 2008, p. 1 to 1.
FiLIP is an electronic leash for your kids' wrists and it's coming to AT&T, Engadget, http://www.engadget.com/2013/10/07/filip-electronic-leash-smartwatch-att/, Oct. 7, 2013, pp. 1 to 8.
International Search Report and Written Opinion for related PCT Application PCT/US2016/057957, dated Jan. 25, 2017, pp. 1 to 15.
Non-Final Office Action for related U.S. Appl. No. 15/299,191, dated Jul. 12, 2017, pp. 1 to 5.

* cited by examiner

MONITORING DEPENDENT INDIVIDUALS

CROSS-REFERENCE TO RELATED APPLICATIONS

The present application claims the benefit of U.S. Provisional Patent Application 62/120,334, filed 24 Feb. 2015, titled MONITORING DEPENDENT INDIVIDUALS, and U.S. Provisional Patent Application 62/244,042, filed 20 Oct. 2015, having the same title. Each of these priority documents is incorporated by reference in its entirety.

BACKGROUND

1. Field

The present invention relates generally to monitoring systems and, more specifically, to systems and methods for monitoring a wearable child-monitor system.

2. Description of the Related Art

In many environments, individuals with underdeveloped and/or impaired ability to determine safety and health hazards need to be monitored. Individuals requiring monitoring may include children, special needs individuals, dementia patients, persons prone to wander, persons with mental disabilities, etc. For a caregiver or supervisor to appropriately monitor the safety of such an individual, it is often desirable for the individual to remain within a specified physical proximity of a caregiver or other supervisor. However, such individuals may be ambulatory or have other mechanisms for movement, such as, for example, a wheel chair, giving them the ability to move outside of the specified physical proximity and making them more difficult to monitor.

Monitoring difficulties may increase when a single caregiver or small number of caregivers is tasked with monitoring a larger group of individuals. Monitoring difficulties may also increase depending on the location and/or environment where monitoring is to occur. For example, it may be more difficult to monitor such individuals in a crowd or in locations with limited line of sight.

Existing monitoring techniques are lacking. Many such systems consume excessive amounts of batter power, often requiring heavier batteries than can be borne by weaker individuals, like small children. Many such systems suffer from excessive false positive rates, which can render the system unusable. Finally, some existing techniques emit wireless signals that convey more information to third parties than is desirable for privacy reasons.

SUMMARY

The following is a non-exhaustive listing of some aspects of the present techniques. These and other aspects are described in the following disclosure.

Some aspects include a wearable child-monitor system. The system comprises: a movable peripheral device associated with a user, the movable peripheral device, comprising: one or more sensors configured to generate output signals conveying information indicating the location of the moveable device with respect to a central unit; a tangible non-transitory machine readable media storing instructions that when executed by one or more processors of the central unit effectuate operations comprising: establish wireless communication between the movable peripheral device and the central unit; define monitoring settings to monitor the location of the movable peripheral device with respect to the central unit, wherein defining the monitoring settings include defining a pre-determined location indicator threshold; send the defined monitoring settings to the movable peripheral device; determine information indicating the location of the moveable peripheral device with respect to the central unit based on the output signals from the one or more sensors; compare the information indicating the location of the moveable peripheral device with the defined monitoring settings; and generate an alert responsive to the information indicating the location of the peripheral device breaching the location indicator threshold.

Some aspects include operations comprising: sending the alert to the moveable peripheral device over the established wireless communication; and activating one or more output components of the movable peripheral device to implement the alert at the movable peripheral device.

BRIEF DESCRIPTION OF THE DRAWINGS

The above-mentioned aspects, and other aspects of the present techniques, will be better understood when the present application is read in view of the following figures in which like numbers indicate similar or identical elements.

Figure 1:
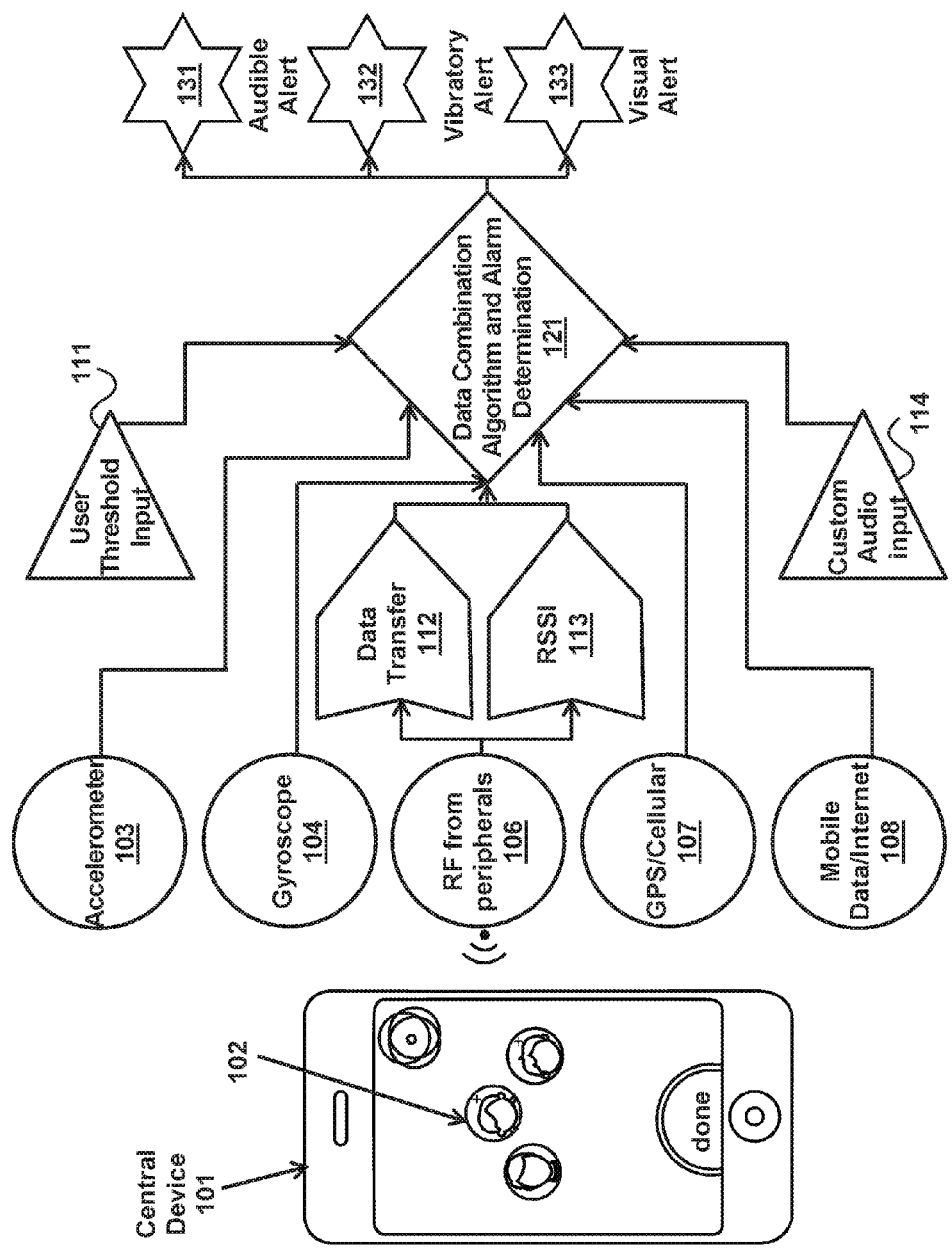
FIG. 1 illustrates an example computer architecture of a central device in accordance with embodiments of the present techniques.

While the invention is susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF CERTAIN EMBODIMENTS

To mitigate the problems described herein, the applicants had to both invent solutions and, in some cases just as importantly, recognize problems overlooked (or not yet foreseen) by others in the field of monitoring systems. Indeed, applicants wish to emphasize the difficulty of recognizing those problems that are nascent and will become much more apparent in the future should trends in monitoring systems industry continue as applicants expect. Further, because multiple problems are addressed, it should be understood that some embodiments are problem-specific, and not all embodiments address every problem with traditional systems described herein or provide every benefit described herein. That said, improvements that solve various permutations of these problems are described below.

Some embodiments provide mechanisms for efficiently monitoring one or more individuals. In some cases, a system of two or more wireless devices in communications with each other can help a user (e.g., a supervisor or caregiver) monitor other individuals (e.g., children, and/or other dependents) by alerting the supervisor or caregiver when an event (like a pre-defined event or an anomalous event) occurs. Examples of wireless devices associated with an individual being monitored may include smart bands, tags, smartphones, tablets, and/or other mobile devices. For example, an alert may be generated when communication between the wireless devices is interrupted (communication between the devices may be a one way communication, and/or two way communication). In some cases, wireless signals may include periodic beacons of a power, duration, and frequency selected to conserve battery power in a wearable monitoring device, like a Low Energy Bluetooth™ beacon. In some cases, information in the beacon may be encoded in a way that protects privacy of individuals being monitored. In some cases, various techniques, like sensor fusion, or integrating a signal from an accelerometer may augment measures of distance based on received beacon signal strength to reduce false-positive rates. That said, several inventions are described, and not all embodiments use all of the inventions, which are independently useful, or provide all of these benefits.

An individual may be monitored for virtually any reason. For example, individuals lacking cognitive skills to independently recognize potentially dangerous or harmful situations are monitored. The alert may be generated to indicate that the individual may be potentially in an inappropriate situation. Lack of cognitive skills can be due to an individual's age, an individual's physical disabilities, an individual's mental disabilities, etc. The use of the monitoring system is not limited to individuals lacking cognitive skills. Other examples of use may include monitoring one or more individuals in crowded environments. For example, a group of friends going out together (e.g., to a show, concert, amusement park, beach, hike, etc.) may decide to monitor each other for safety reasons, and/or so it's easy for them to find each other. Other examples may include monitoring individuals with health issues, in these cases a health sensor may be associated with the wireless device (or the health sensor may act as the wireless device), and an alert may be generated if a health parameter measured by the sensor (e.g., heart rate, breathing parameters, blood oxygen, etc.) is outside a range (e.g., a pre-defined range), and/or if the measured health parameter breaches a threshold (e.g., a pre-defined threshold). In some cases, an alert may be generated if (e.g., in response to) a problem with the wireless device associated with the individual being monitored is detected. For example, a problem with functionality of the wireless device, or in the case of a wearable device a breakage of the wearable device, loss of contact between the wearable device and the individual being monitored (e.g., breakage of band, unlocking of the device, failure of locking mechanism, mechanical integrity of the band using an electrical circuit continuity sensor; state of band locking mechanism using electrical circuit continuity sensor; bad contact with a tag, etc.) In some cases, an alert may be generated based on a combination of parameters including one or more of the examples provided above, and/or other pre-defined parameters.

In some embodiments, a monitoring system may include a plurality of wirelessly communicating sensor devices, including a central device and a carryable or wearable peripheral device. The wireless connection may be a Bluetooth connection, e.g., Low Energy Bluetooth selected to conserve battery power, using 2 Mhz wide channels in 2.4-2.4835 GHz band, and transmitting with Gaussian frequency shift modulation, as specified in the Bluetooth core specification version 4.0, the low-energy portion of which is hereby incorporated by reference. Various techniques may be used to further reduce power consumption. In some cases, a beaconing rate may be modulated based on an estimated distance, e.g., the central device may send a signal indicative of the distance between the devices, and the peripheral device may lower the beaconing rate as distance to the next threshold distance increases. Or in some cases, the central device may beacon, and the peripheral device may only respond with its own beacon or alarm when the signal strength from the central device beacon approaches or exceeds a threshold. In some cases, the broadcast strength of beacons may be adjusted based on distance, e.g., the broadcast strength may be encoded in the beacon, and the strength may change as one device indicates to the other that the distance has changed, with stronger signals being used as devices move further apart.

Other embodiments may use Wi-Fi, Global System for Mobile Communications (GSM), Code division multiple access (CDMA), Ultra Low Frequency (ULF), and/or other mobile data protocols. In some cases, a monitoring system may include a central device, one or more stationary peripheral devices, and one or more carryable or wearable peripheral devices. The monitoring system may assist with the supervision of dependents to monitor and alert the supervisor/caregiver (or other users of the monitoring system) that a monitored individual is in a potentially dangerous situation based on distance, approximate location, motion, health information, and/or other information. Not only dangerous situations are monitored, wearable peripheral devices may be monitored for any reasons defined by the user of the monitoring system, in some use cases.

In some cases, the wireless connection between the control device and the carryable or wearable peripheral devices may be a Radio Frequency (RF) connection (e.g., Bluetooth, an Ultra-Low Frequency (ULF), a Wi-Fi, and/or other RF connections). Strength of a received wireless signal, as perceived at the central unit, from a signal broadcast by the peripheral device, may indicate the approximate location (as a location indicator) of the carryable or wearable peripheral devices with respect to the central unit. (Location need not be expressed in absolute coordinates for these purposes, and location may be expressed as an estimated distance, without indicating a direction.) For example, the user may set a range for communication data levels between the central device and the carryable or wearable peripheral devices. When the communications data levels (e.g., Received Signal Strength Indication (RSSI) power measurements or some other indication of relative received signal strength in a wireless environment) not within an acceptable predetermined range (e.g., less than a threshold), an alert may be presented at the control device and, in some embodiments, also at the carryable or wearable peripheral device. In some cases a location indicator threshold may be determined and if (e.g., in response to detecting that) the threshold is breached an alert is generated (the alert may be generated at the moment of the breach or before, or after the breach). In some cases, an alert may be generated if (e.g., in response to detecting that) the location indicator approaches a threshold or an upper or lower range in pre-determined range. This type of alerts may be a low level alert. Other types of alerts may be defined depending on the level of the breaching. For example, a vibrating alert may be a low level alert, and an audible alert may be a high level alert. Embodiments may compare a signal strength or estimated distance to a plurality of thresholds, each corresponding to a different alert level, and select an alert to present base on the highest threshold exceeded. Examples of alerts may include: vibratory related output (e.g., used to alert the wearable device wearer that the threshold has not been maintained or exceeded) in some cases the vibratory output may include adjustable parameters for persons with tactile sensitivity (e.g., amplitude; frequency; duration, etc.). Other examples of alerts may include: audible related output (e.g., high volume alarm to indicate approximate location of node; adjustable tone, volume, and sound pattern, voice commands for user to indicate actions to be taken to avoid danger, prerecorded, live, etc.); optical related output (e.g., light source used to alert any user of device alarm; adjustable intensity, color, and flashing pattern, etc.); and/or other types of alerts. Often caregivers face a high cognitive load, and a highly informative alert pattern may help the user to quickly assess the issue and either respond or disregard the alert. More informative alerts are expected to mitigate problems with false positives, as less intrusive alerts corresponding to smaller distances can be disregarded.

In response to an alert at the central device, the supervisor or caregiver can move to the physical location of the monitored individual to provide assistance, or take other action (try to re-establish contact with the monitored peripheral, call 911, etc.) In response to an alert at the carryable or wearable peripheral device and if a monitored individual has sufficient physical and/or mental capabilities to recognize and respond to the alert, the monitored individual may also take remedial action. In other cases, even if the monitored individual cannot take remedial action, the alert may help other people take action (e.g., someone may see or hear the alert and may be able to provide assistance to the individual, or the user (e.g., caregiver) may be able to hear or see the alert coming from the carryable or wearable peripheral device and thereby locating the individual, etc.) Alerts can include one or more of: visual, audible, and tactile (e.g., vibrations) components.

FIG. 1 illustrates an example computer architecture of a central device 101. Central device 101 is a control device configured to monitor one or more carryable or wearable (which is not to imply that wearable devices are not carryable) peripheral devices. In some embodiments, central device 101 (e.g., laptop computers, handheld computers, netbooks, tablets, smartphones, smartwatches, personal digital assistants (PDAs), cellular telephones, personal computers (PCs), and/or other computing platforms) may include a user interface 102. User interface 102 may allow a user (e.g., caregiver/supervisor) to connect to multiple carryable or wearable peripheral devices, stationary peripheral devices, and/or other components within or outside of the monitoring system. User interface 102 may be configured to set thresholds, acceptable ranges for sensory data and/or other alert parameters. In some embodiments, user interface 102 may be configured to produce the alerts (produce a visual, sound, tactile, and/or other alerts). In some cases, a wearable device on the caregiver may receive the alert from a smartphone via a personal area network and present the alert, e.g., via smartwatch or earpiece.

A carryable or wearable peripheral device may be configured to remain in contact with (e.g., be attached to) a monitored individual. A carryable or wearable peripheral device may emit signals indicative of the location, motion, and/or (when associated with the appropriate sensors) health data of the individual. A carryable or wearable peripheral device may be used by caregivers and/or monitored individuals. In some embodiments, carryable or wearable peripheral devices may include one or more processors, storage media, user interfaces, and or other components. Examples of carryable or wearable peripheral devices include wrist-born embedded systems having a radio, microprocessor, battery, and in some cases, a biometric sensor array. In some embodiments, the embedded system may include an inertial measurement unit, and the microprocessor may integrate inertial measurement signals and embed results in beacons to augment signal-strength based rangefinding. In some cases, embodiments may be characterized as smart bands, tags, smartphones, watches, sensors (health sensors or other sensors) tablets, and other mobile devices. In some embodiments a smart band may be configured to fit on a wearer's body part (e.g., a wrist band, an ankle band, a chest band, a neck band, and/or other band that fits, and/or surrounds the wearer's body part). The smart band may be configured to include a locking mechanism that allows the user (monitor) to lock and unlock the band to prevent it from being removed. In some cases, the smart band may include an electrical circuit continuity sensor for monitoring mechanical integrity of the locking mechanism and detecting failure of the locking mechanism or breakage of the band.

In some embodiments, sensory data may include any data that may be monitored by a sensor at a central device, a stationary peripheral device, or a carryable or wearable peripheral device. For example: safety related sensory data, including: approximate location, and/or proximity data; motional data; physical data (e.g., impact, mechanical integrity, etc.); environmental data (e.g., temperature, humidity, optical, internet data, health related sensory data (e.g., heart rate, blood glucose, oxygen, body temperature skin humidity, EMG (muscular electrical activity), etc.)

A user may configure acceptable ranges and thresholds for sensory data by inputting user threshold input 111 to data combination algorithm and alarm determination 121. Threshold input 111 may indicate what conditions in sensory data cause what notifications, alerts, alarms, etc. In some cases, sensory and internet data may be provided by the central device 101's hardware, software, as well as via RF from peripheral stationary node(s) and peripheral wearable device(s). Received data is combined algorithmically to compare with user-defined thresholds. If the combined data is not within user defined thresholds (e.g., a carryable or wearable peripheral device is too far away from central device 101), different types of alarms (or other alerts or notifications) may be issued. Alarms (or other alerts or notifications) may be presented at central device 101 as one or more of: visual displays, sound, or vibrations having varied intensities based on the severity of the alarm.

In some embodiments, during operation, data combination algorithm and alarm determination 121 may receive input from one or more of accelerometer 103, gyroscope 104, Radio Frequency (RF) communication 106 from peripherals, Global Positioning System and Cellular communication 107 from peripherals, mobile data/Internet 108, custom audio input 114, and/or information from other sensors of components within or outside of the monitoring system.

For example, in some cases, data combination algorithm and alarm determination may receive information from accelerometer 103. Accelerometer 103 may be a single or multi-axis accelerometer. Such information may include measurement of the movement of the moveable peripherals (e.g., acceleration, number of steps taken by the individual associated with the peripheral, orientation, detect if the moveable peripherals fell or in the process of falling, etc.) In some cases if the individual falls, information from the accelerometer 103 may indicate the height of the fall and/or potential impact.

In some embodiments, data combination algorithm and alarm determination 121 may receive information from gyroscope (or other type of inertial measurement unit, like a three or six axis accelerometer) 104 (e.g., microelectromechanical systems MEMS gyroscope, and/or other types of gyroscopes). Such information may include measurement of orientation and/or rotation of the moveable peripherals. In some embodiments, information from accelerometer 103 and gyroscope 104 may be combined for more accurate motion and orientation sensing. In some embodiments, a compass (e.g., a magnetometer) for measuring orientation may be used instead of the gyroscope 104 or in conjunction with it. In some embodiments, data combination algorithm and alarm determination 121 may receive user audio input 114 may include sending audio to a wearable peripheral device in the form of a file or live broadcasting in order to alert/communicate with the person associated with (e.g., wearing) the wearable peripheral device. In other cases, the user input may be in the form of text input. Data combination algorithm and alarm determination 121 may process received input to determine if thresholds for any of audible alert 131, vibratory alert 132, or visual alert 133 (or any other notifications or alarms) are satisfied. The alerts (or other notifications or alarms) may be output at central device 101 or at a peripheral wearable device, for example, on screen, through a speaker, or through vibration of central device 101. An alert (or other notification or alarm) may also be sent from central device 101 to a carryable or wearable peripheral device that caused the alert (or other notification or alarm).

In some embodiments, in some cases, data combination algorithm and alarm determination may receive information from Global Positioning System (GPS), and/or Cellular triangulation (using GSM and/or CDMA technologies) indicating the approximate location of the monitored peripherals. In some embodiments, approximate location of the monitored peripherals may be extracted from mobile Data/Internet 108 sent or received by the peripherals (e.g., using technologies such as 3G, 4G, 4G LTE, and/or 5G).

In some embodiments, communication between the central device 101 and peripheral devices may be a radio frequency (RF) communication 106. In some cases, RF communications 106 may include one or more of Bluetooth, Wi-Fi, ultra-low frequency (ULF), and/or other RF communications. For example, in the case of a Bluetooth connection, central unit 101 may establish a Bluetooth connection with a moveable peripheral, a wearable smart band for example. Central unit 101 may be the master Bluetooth device (initiates the connection) and may be able to communicate with the smart band and additional moveable or stationary peripherals (forming a Bluetooth network). In other cases, Central device 101 may switch roles with one of the peripherals and becomes a slave. In other cases, central device 101 may be a master and a slave. After establishing the connection, central device 101 may communicate monitoring settings to the smart band (and/or moveable or stationary peripherals). The monitoring settings may be defined by the user of central device 101 and sent wirelessly to the smart band (the settings may be sent via the Bluetooth connection, other wireless connections, and/or wired connection). In some cases, the settings may be input directly into the smart band (and/or moveable or stationary peripherals) via a user interface. An example of monitoring setting may be the Bluetooth connection, such that if the Bluetooth connection is interrupted an alert may be generated. Other examples of monitoring setting may include any pre-defined values for information exchanged between central device 101 and the smart band (and/or moveable or stationary peripherals) via the Bluetooth connection.

In some embodiments, monitoring settings may include communication data levels (e.g., a predetermined range, threshold levels, etc.) Data communication levels may include strength of received signal between the central device 101 and the smart band, and/or other indication of relative received signal strength in a wireless environment. Strength of received signal is usually referred to as received signal strength indicator (RSSI), and it represents a measurement of the power present in a received radio signal, the higher the RSSI the stronger the signal. The measurement of the RSSI may be done by wireless network cards in central device 101 and the smart band. RSSI values may be mapped to distance values through calibration In some embodiments, distance calculations may be augmented with inertial measurement unit readings on both the central device and the peripheral device. For instance, IMU readings may be polled and integrated by the wearable device, and a distance and direction of travel vector may be encoded in a beacon transmitted by the device. The central device may similarly monitor its own IMU and integrate signals to form another vector. The two vectors, one being received via the beacon, may be subtracted to calculate an IMU-based distance. The IMU based distance may be combined with a beacon signal strength-based distance at the central unit to ascertain distance, e.g., a signal-strength based distance measurement over a threshold distance may be disregarded for a duration of time in response to the IMU measurements indicating a smaller change in distance between the two units (as might happen if a child walks behind a wall or other signal-attenuating object). In some cases, the two devices may "zero" their IMU integrals in response to the signal strength exceeding a threshold corresponding to the two units being within one meter or so of one another to prevent drift from interfering with the measurements. Or another type of signal may be used to trigger an IMU integral re-sent, e.g., an ultrasonic chirp by the peripheral device may be received by a microphone of the central device and trigger an IMU integral re-zeroing.

In some embodiments, connection between device 101 and the smart band (and/or moveable or stationary peripherals) may be an ultra-low frequency (ULF) communication. ULF communications may be used for secure communications between device 101 and the peripherals as the ultra-low frequencies are able to penetrate the ground. In some embodiments, ULF frequency may range between 300 hertz and 3 kilohertz (other frequency ranges may be considered).

In some embodiments, a Wi-Fi communication may be used. For example, central unit 101 may communicate, via a Wi-Fi connection, with a moveable peripheral, the smart band (and/or moveable or stationary peripherals). In some embodiments the communication may be a direct communication between Central unit 101 and the peripherals without going through the access point (e.g., Wi-Fi is Tunneled Direct Link Setup (TDLS), and/or Wi-Fi DIRECT). An example of monitoring setting may be the Wi-Fi connection, such that if the Wi-Fi connection is interrupted an alert may be generated. Other examples of monitoring setting may include any pre-defined values for information exchanged between central device 101 and the smart band (and/or moveable or stationary peripherals) via the Wi-Fi connection.

In general, a control device can be used to configure the alert settings of the system and change settings of other devices wirelessly. A control device may also act as a peripheral wearable node in the case of a smartphone or tablet to increase accuracy of motional data gathered between the peripherals. When a control device acts as a peripheral wearable node, the control device can also have live-updating of known location. Live-updating can be facilitated by using Global Positioning System (GPS) on a control device and in connection with RSSI to determine an approximate location. Live-update can also be extended to using Wi-Fi access points to increase accuracy. Examples of control devices include smartphones, tablets, computers, or custom devices with a user interface.

In some embodiments, one or more stationary peripheral devices are used to communicate with carryable or wearable peripheral devices and monitor ranges. A stationary peripheral device may be used in tandem with other stationary peripheral devices and/or in tandem with carryable or wearable peripheral devices. A stationary peripheral device may have a further network connection to the control device. The stationary peripheral device may relay data for carryable or wearable peripheral devices back to the control device. As such, stationary peripheral devices may extend the reach of the monitoring system by permitting a control device to monitor data for a carryable or wearable peripheral device that is otherwise outside of communication range with the control device. In some embodiments, a stationary peripheral device may also be used to monitor the signal strength of a central device and/or other stationary peripheral devices. In one aspect, public Wi-Fi access points or mobile towers may be used as stationary devices.

Figure 2:
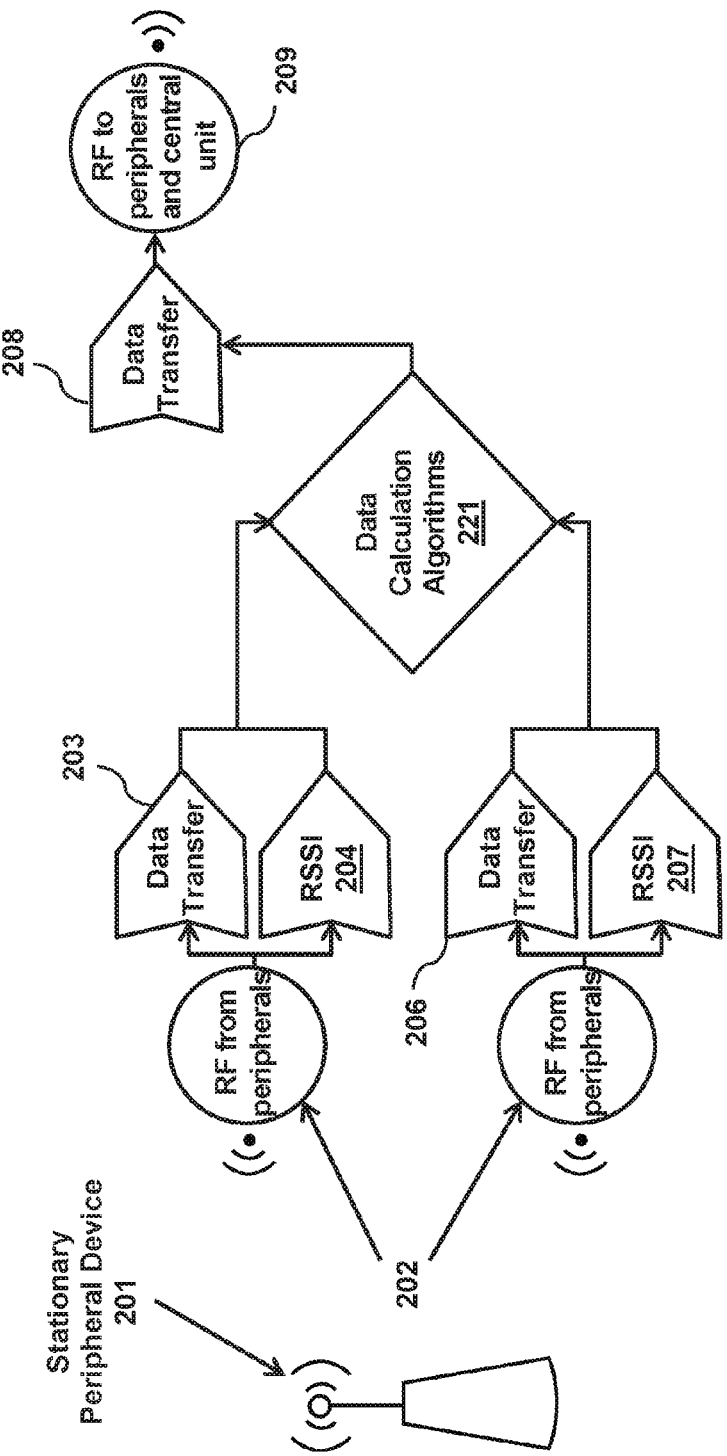
FIG. 2 illustrates an example computer architecture of a stationary peripheral device in accordance with embodiments of the present techniques.

FIG. 2 illustrates an example computer architecture of a stationary peripheral device 201. Stationary peripheral device 201 includes data calculation algorithms 221. Data calculation algorithms 221 may determine what data is to be transferred to a central device and/or other peripheral devices and when and how to transfer data to a central device and/or other peripheral devices. Data calculation algorithms 221 may receive RF communication 202 from other peripherals (either stationary or carryable/wearable). RF communication 202 may include data transfers 203 and 206 and RSSI 204 and 207. Data Calculation algorithms 221 may determine from data transfers 203 and 206 and RSSI 204 and 207 that data transfer 208 is to be sent to a central device and/or other peripheral devices. Stationary peripheral device 201 may send data transfer 208 to central device and/or other peripheral devices through RF communication 209.

Figure 3:
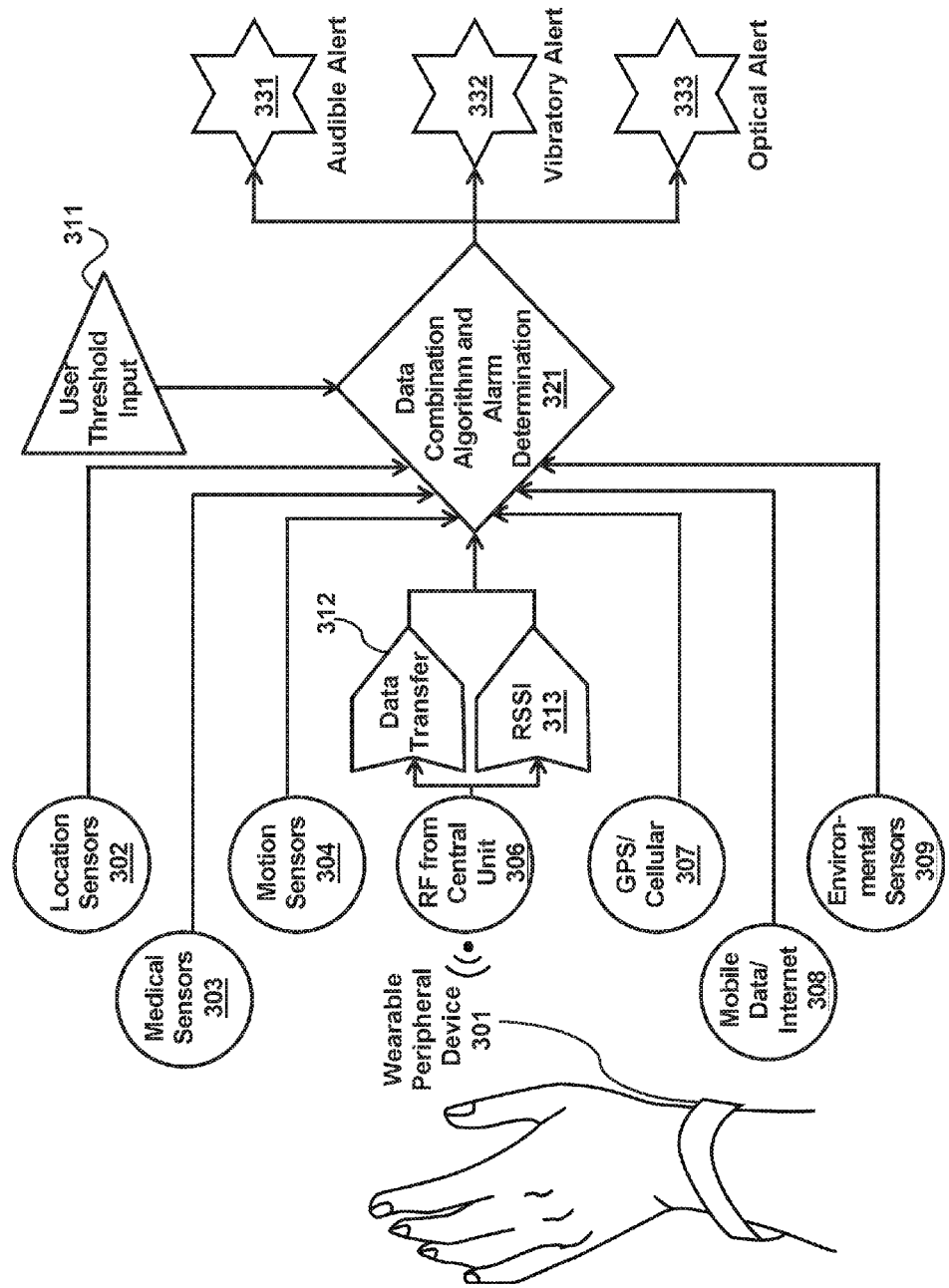
FIG. 3 illustrates an example computer architecture of a wearable peripheral device in accordance with embodiments of the present techniques.

FIG. 3 illustrates an example computer architecture of a wearable peripheral device 301. In some embodiments, sensory and internet data is provided by the wearable peripheral device 301's hardware as well as via RF from other peripheral devices(s) and a central device Received data is combined algorithmically to compare with user-defined thresholds. (Wearable peripheral device 301 may also send data). If the combined data is not within user defined thresholds (e.g., wearable peripheral 301 is too far away from a central device), different types of alarms (or other alerts or notifications) may be issued. Alarms (or other alerts or notifications) may be presented at wearable peripheral device 301 as one of more of: visual displays, sound, or vibrations having varied intensities based on the severity of the alarm.

In some embodiments, during operation, data combination algorithm and alarm determination 321 may receive input from any of: location sensors 302, medical sensors 303, motion sensors 304, Radio Frequency (RF) communication 306 from a central unit, Global Positioning System and Cellular communication 307, mobile data/Internet 308, and environmental sensors 309. RF communication 306 from a central unit may include data transfer 312 and RSSI 313. Data combination algorithm and alarm determination 321 may process received input to determine if thresholds for any of audible alert 331, vibratory alert 332, or visual alert 333 (or any other notifications or alarms) are satisfied. If so, the alerts (or other notifications or alarms) may be output at wearable peripheral device 301, for example, on a screen or LED, through a speaker, or through vibration of wearable peripheral device 301. An alert (or other notification or alarm) may also be sent from wearable peripheral device 301 to a central device or to s stationary peripheral device (for subsequent relay to a central device).

Sensors 303 may be configured to generate output signals conveying information related to the monitored individual. In some embodiments, sensors 303 may include health sensors, and/or other sensors. For example, sensors 303 may include one or more of a heart rate sensor, a blood pressure sensor/monitor, a weight scale, a blood glucose monitor, a blood oxygen saturation monitor (e.g., a pulse oximeter), a hydration monitor, a skin/body temperature thermometer, a respiration monitor, electroencephalogram (EEG) electrodes, and/or other medical sensors. Sensors may also include environmental sensors, like a water-immersion sensor. Information related to the monitored individual obtained from sensors 303 may include heart rate, blood pressure, weight, pulse rate, blood chemistry, blood oxygen saturation, blood glucose level, hydration information, respiration rate, breathing information, skin/body temperature, brain activity, etc. Sensors 303 are configured to generate any output signals conveying information related to the user that allows monitoring system 300 to function as described herein. In some embodiments, sensors 303 may be disposed in a plurality of locations within or outside of monitoring system 300. For example, sensors 303 may be located in wearable peripheral device 301, located in a medical device used by the user, and/or in other locations within or outside of monitoring system 300.

Figure 4:
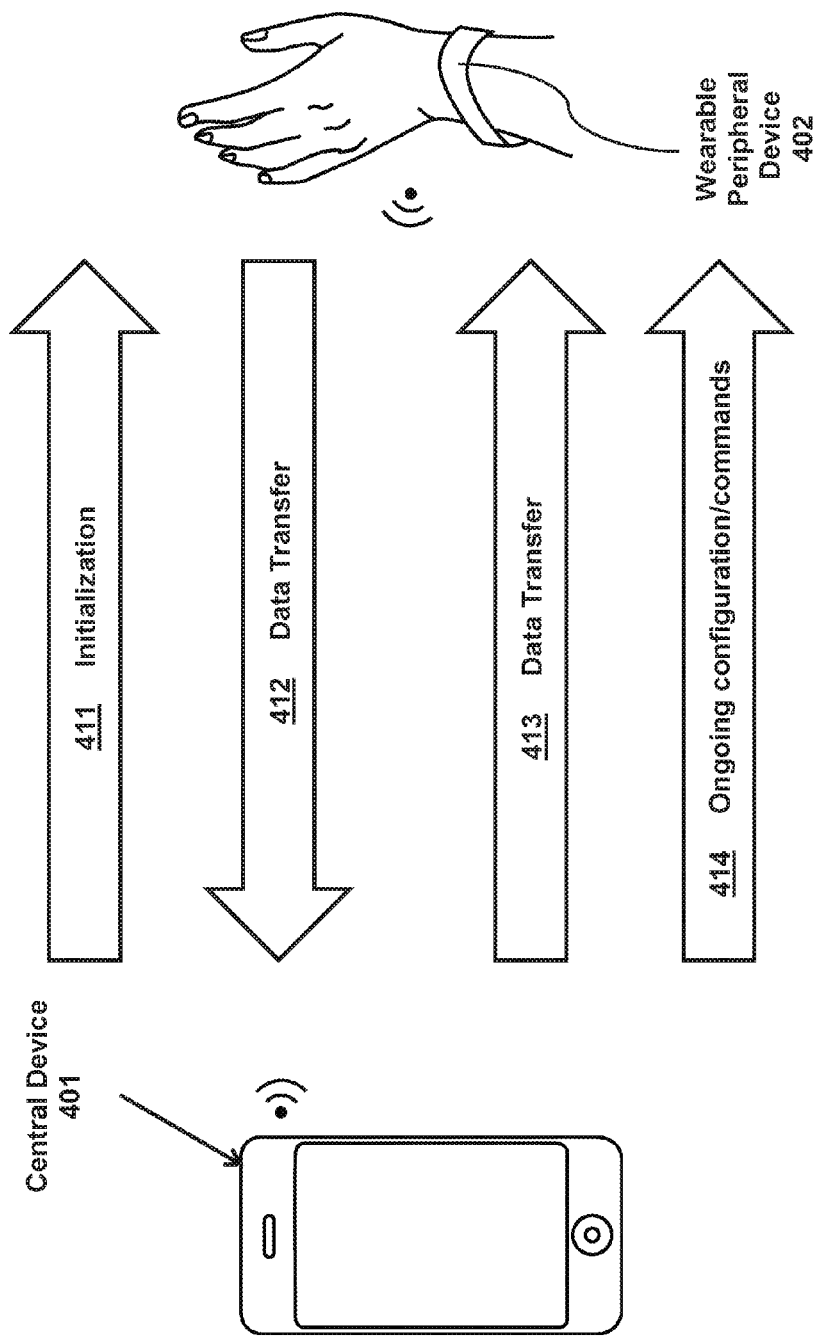
FIG. 4 illustrates an example data flow between a central device and a wearable peripheral device in accordance with embodiments of the present techniques.

FIG. 4 illustrates an example data flow between a central device 401 (e.g., a smart phone or mobile device) and a wearable peripheral device 402 (e.g., a smart band). Central device 401 may initialize 411 communications with wearable peripheral device 402 by establishing a wireless connection with wearable peripheral device 402. Central device 401 may send alarm (or other alert or notification) settings to wearable peripheral device 402 over the established wireless connection. The wireless connection may be any of Bluetooth, Wi-Fi, Global System for Mobile Communications (GSM), Code division multiple access (CDMA), Ultra Low Frequency (ULF), or other mobile data protocols.

Wearable peripheral device 402 may perform data transfer 412 to central device 401. Data transfer 412 may include wearable peripheral device 402 transferring sensory data to central device 401 using the established wireless connection.

Central device 401 may analyze the sensory data in order to monitor the status of wearable peripheral device 402. Central device 401 may perform data transfer 413 to wearable peripheral device 402. Data transfer 413 may include central device 401 transferring local sensory data from the central device's local sensors to wearable peripheral device 402 over the established wireless connection.

Central device 401 may send ongoing configuration/commands 414 to wearable peripheral device 402. Ongoing configuration/commands 414 may include central device 401 updating alarm (or other alert or notification) settings of wearable peripheral device 402 over the established wireless connection. Ongoing configuration/commands 414 may also include central device 401 issuing alarms (or other alerts or notifications) over the established wireless connection in order to notify or locate the wearer of wearable peripheral device 402.

Devices may be arranged in a variety of different possible configurations to monitor an individual. A single link configuration includes a single control device and one or more carryable or wearable peripheral devices. In the single link configuration, the single control device monitors the one or more carryable or wearable peripheral devices. The single link configuration may be useful for a parent (with the control device) to monitor one or more children (each having an attached wearable peripheral device). In the single link configuration, communication may occur from the central device to any of the wearable peripheral devices, from any of the wearable peripheral devices to the central device, and from the Internet to the central unit and to any of the wearable peripheral devices.

Figure 5:
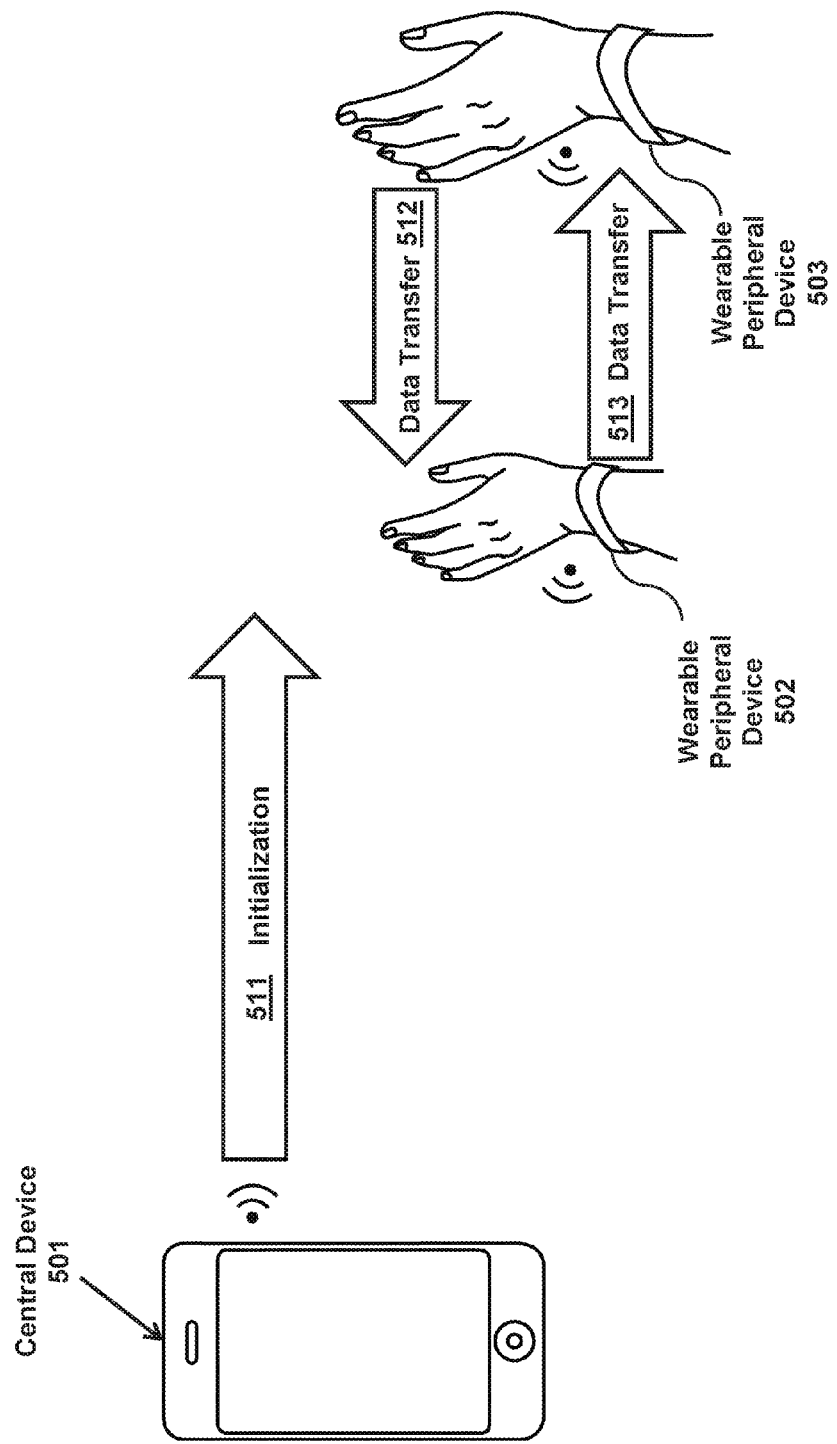
FIG. 5 illustrates an example data flow between a central device and multiple wearable peripheral devices in accordance with embodiments of the present techniques.

FIG. 5 illustrates an example data flow between a central device 501 (e.g., a smart phone or mobile device) and wearable peripheral devices 502 and 503 (e.g., smart bands). Central device 501 may initialize 511 communications with wearable peripheral devices 502 and 503 by establishing a wireless connection with wearable peripheral devices 502 and 503. Central device 501 may send alarm (or other alert or notification) settings to wearable peripheral devices 402 and 403 over the established wireless connection. The wireless connection may be any of Bluetooth, Wi-Fi, Global System for Mobile Communications (GSM), Code division multiple access (CDMA), Ultra Low Frequency (ULF), or other mobile data protocols. In some embodiments, wearable peripheral devices 502 and 503 may also establish a wireless connection between one another forming a tethered network. Wearable peripheral devices 502 and 503 may monitor one another over the tethered network.

Wearable peripheral device 503 may perform data transfer 512 to wearable peripheral device 502. Data transfer 512 may include wearable peripheral device 503 transferring sensory data to wearable peripheral device 502 over the tethered network. Wearable peripheral device 502 may analyze the sensory data in order to monitor the status of wearable peripheral device 503. Wearable peripheral device 502 may also trigger alarms, alerts, or other notifications on wearable peripheral device 503 and/or vice versa. In some embodiments, wearable peripheral device 502 may perform data transfer 513 to wearable peripheral device 503. Data transfer 513 may include wearable peripheral device 502 transferring sensory data to wearable peripheral device 503 over the tethered network. Wearable peripheral device 503 may analyze the sensory data in order to monitor the status of wearable peripheral device 502.

In some embodiments, a tethered network configuration may include one or more central devices and a plurality of carryable or wearable peripheral devices. In the single link configuration, the one or control devices monitor the plurality of carryable or wearable peripheral devices. The tethered network configuration may be useful for providing a buddy system, for example, on a field trip. In the tethered network configuration, individuals may both monitor other individuals and be monitored by other individuals. In the tethered network configuration, communication may occur from a central device to a carryable or wearable peripheral device, from a carryable or wearable peripheral device to a central device, from the Internet to a central unit and to a carryable or wearable peripheral device, between central devices, and between carryable or wearable peripheral devices.

A central node with remote control configuration includes a central device (remote), a stationary peripheral device, and one or more carryable or wearable peripheral devices. In the central node with remote control configuration, the stationary peripheral device monitors the one or more carryable or wearable peripheral devices and relays information to the central device. The central node with remote control configuration may be useful for remote supervision of individuals (e.g., children) within a home over the Internet. In the central node with remote control configuration communication may occur between the central device and stationary peripheral device and between the stationary peripheral device (e.g., over the Internet) and the one or more carryable or wearable peripheral devices.

Figure 6:
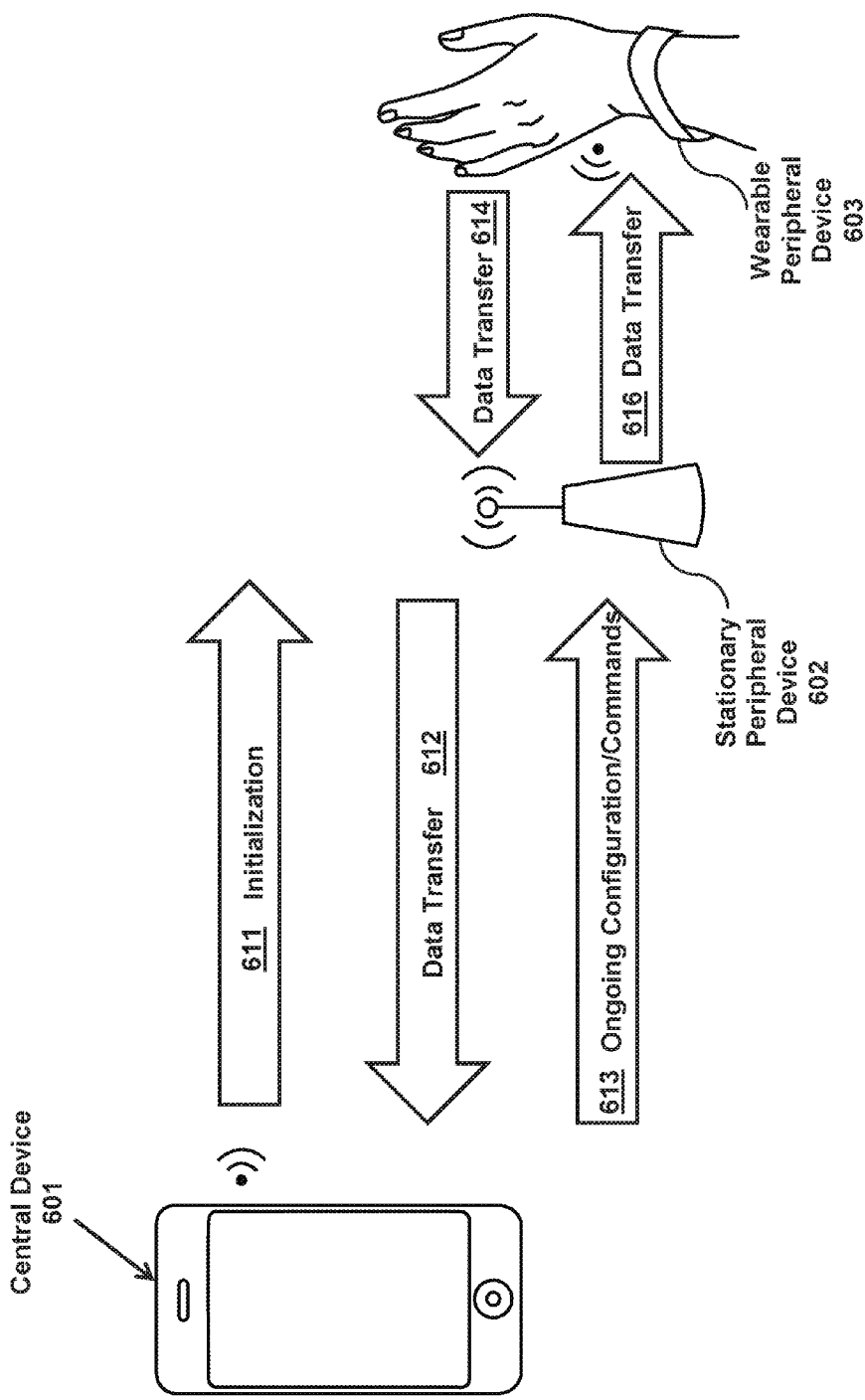
FIG. 6 illustrates an example data flow between a central device, a stationary peripheral device, and a wearable peripheral device in accordance with embodiments of the present techniques.

FIG. 6 illustrates an example data flow between a central device 501 (e.g., a smart phone or mobile device that may be remotely connected via the Internet), a stationary peripheral device 602 (e.g., a custom wireless device), and wearable peripheral device 603 (e.g., a smart band). Additional wearable peripheral devices (not shown) may also be in communication with stationary peripheral device 602.

Central device 601 may initialize 611 communications with stationary peripheral device 602 and wearable peripheral device 603 by establishing a wireless connection with stationary peripheral device 602 and wearable peripheral device 603. Central device 601 may send alarm (or other alert or notification) settings to wearable peripheral device 603 over the established wireless connection. Stationary peripheral device 602 may relay alarm (or other alert or notification) settings to wearable peripheral device 603. The wireless connection may be any of Bluetooth, Wi-Fi, Global System for Mobile Communications (GSM), Code division multiple access (CDMA), Ultra Low Frequency (ULF), or other mobile data protocols.

Wearable peripheral device 603 may perform data transfer 614 to stationary peripheral device 602. Data transfer 614 may include wearable peripheral device 603 transferring sensory data to stationary peripheral device 602 using the established wireless connection. Stationary peripheral device 602 may analyze the sensory data in order to monitor the status of wearable peripheral device 603. Stationary peripheral device 602 may perform data transfer 612 to central device 601. Data transfer 612 may include stationary peripheral device 602 relaying sensory data from data transfer 614 to central device 601. Central device 601 may analyze the sensory data in order to monitor the status of wearable peripheral device 603.

Central device 601 may send ongoing configuration/commands 613 to stationary peripheral device 602. Ongoing configuration/commands 613 may include central device 601 updating alarm (or other alert or notification) settings of wearable peripheral device 603 over the established wireless connection. Ongoing configuration/commands 613 may also include central device 601 issuing alarms (or other alerts or notifications) over the established wireless connection in order to notify or locate the wearer of wearable peripheral device 603.

Stationary peripheral device 602 may perform data transfer 616 to wearable peripheral device 603. Data transfer 616 may include stationary peripheral device 602 relaying ongoing configuration/commands 613 to wearable peripheral device 603.

A localizing network configuration includes may include a central device, a plurality of stationary peripheral devices, and one or more carryable or wearable peripheral devices. In the localizing network configuration, the plurality of stationary peripheral devices monitor the one or more carryable or wearable peripheral devices and relay information to one another and/or to the central device. The localizing network configuration may be useful for tracking of individuals (e.g., children) within a home or other building over the Internet, for example, when the home or building is larger than the range of a single stationary peripheral device. In the localizing network configuration, communication may occur between the central device and peripheral devices, between stationary peripheral devices (to extend range of network communication), from stationary peripheral devices and carryable or wearable peripheral devices to (extend range of network communication), and from carryable or wearable peripheral devices to stationary peripheral devices.

Figure 7:
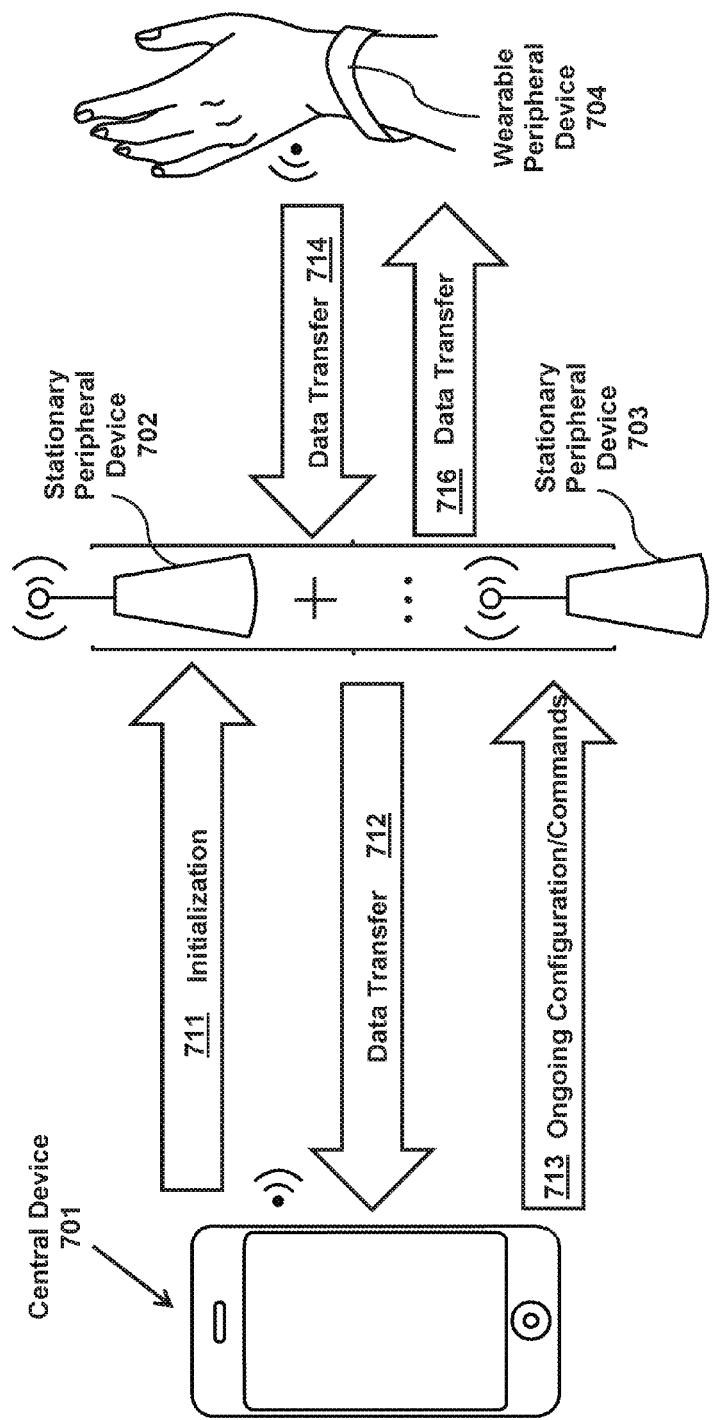
FIG. 7 illustrates an example data flow between a central device, multiple stationary peripheral devices, and a wearable peripheral device in accordance with embodiments of the present techniques.

FIG. 7 illustrates an example data flow between central device 701 (e.g., a smart phone or mobile device that may be remotely connected via the Internet), stationary peripheral devices 702 and 703 (e.g., customer wireless devices), and wearable peripheral device 704 (e.g., a smart band).

Stationary peripheral devices 702 and 703 may establish a wireless connection between one another (and any other stationary peripheral devices) forming a localizing network. The locations of stationary peripheral devices 702 and 703 (and any other stationary peripheral devices) may be known (and pre-programmed) such that stationary peripheral devices 702 and 703 (and any other stationary peripheral devices) may be used for triangulation using established wireless connection. The wireless connection may be any of Bluetooth, Wi-Fi, Global System for Mobile Communications (GSM), Code division multiple access (CDMA), Ultra Low Frequency (ULF), or other mobile data protocols.

Central device 701 may initialize 711 communications with stationary peripheral devices 702 and 703 (and any other stationary peripheral devices included in the localizing network) by establishing a wireless connection with the localizing network and wearable peripheral device 704. Central device 701 may send alarm (or other alert or notification) settings to wearable peripheral device 704 over the established wireless connection. A stationary peripheral device within the localizing network may relay alarm (or other alert or notification) settings to wearable peripheral device 704.

Wearable peripheral device 704 may perform data transfer 714 to a stationary peripheral device in the localizing network. Data transfer 714 may include wearable peripheral device 703 transferring sensory data to the stationary peripheral device (e.g., 702 or 703) in the localizing network using the established wireless connection. The stationary peripheral device may transmit data and create a matrix of RSSI data on a central device in order to monitor the status of wearable peripheral device 704 (and may also perform some data analysis). The stationary peripheral device 702 may perform data transfer 712 to central device 701. Data transfer 712 may include the stationary peripheral device relaying sensory data from data transfer 714 to central device 701.

Central device 701 may analyze the sensory data in order to monitor the status of wearable peripheral device 704.

Central device 701 may send ongoing configuration/commands 713 to a stationary peripheral device (e.g., 702 or 703) in the localizing network. Ongoing configuration/commands 713 may include central device 701 updating alarm (or other alert or notification) settings of wearable peripheral device 704 over the established wireless connection. Ongoing configuration/commands 713 may also include central device 701 issuing alarms (or other alerts or notifications) over the established wireless connection in order to notify or locate the wearer of wearable peripheral device 704.

The stationary peripheral device may perform data transfer 716 to wearable peripheral device 704. Data transfer 716 may include the stationary peripheral device relaying ongoing configuration/commands 713 to wearable peripheral device 704.

Various different configurations and numbers of central devices, stationary peripheral devices, and carryable or wearable peripheral devices have been described for monitoring dependent individuals. However, other arrangements and groupings of one or more central devices and one or more carryable or wearable peripheral devices and potentially also one or more stationary peripheral devices are also possible to facilitate monitoring of dependent individuals. Devices may be flexibly arranged to meet the needs for virtually any specified monitoring environment.

To protect privacy and security, in some embodiments, the devices in the illustrated system may cryptographically authenticate themselves to one another. Some embodiments may use an asymmetric encryption scheme, like RSA or DAS, in which two keys (the key pair) are generated and linked to one another, such that a message encrypted with one key can be decrypted with another key (but with the first key remaining unknown to the holder of the second key, in some embodiments). Or, in some embodiments, each device may store in memory a shared, factory-set random string and the string may be "xor'ed" with messages to encrypt data.

In some embodiments, firmware of the peripheral device may store a unique, factory-set decryption key. The corresponding encryption key that matches the decryption key may be stored on a remote server, e.g., in a database, in association with a serial number of the peripheral device and a value indicating if the key has been used or is associated with an account yet. In some cases, the keys are set at the factory and do not change.

To authenticate a central device and peripheral device pair (and allow the central device to access data broadcast by the peripheral device), upon purchasing a new peripheral device, the user may navigate to a menu in a native application in the central device to configure the user's account. In this menu, the user may enter a serial number of the peripheral device, and the application may send the serial number to the remote server, which may retrieve the corresponding key from the database. In some cases, the server may maintain a record in the database indicative of whether the serial number is associated with a device that has already been claimed and block, or require additional authentication credentials, when a device has already been claimed to prevent third parties who later see the serial number from obtaining a key.

In some cases, before sending the key to the native application, the server may authenticate the peripheral device via the native application. To this end, the server may first encrypt a random string (e.g., a pseudo random string, or other difficult to predict string) with an encryption key paired to the decryption key on the peripheral device, e.g., such that only the peripheral device has access to a key to decrypt the string. The encrypted string may be sent to the native application, which may relay the encrypted string to the peripheral device. The peripheral device may decrypt the encrypted message and send the decrypted string (or a value based on the decrypted string sufficient to prove decryption) back to the server via the native application to confirm that the peripheral device has access to the corresponding key. Upon verifying this, the server may send the encryption key to the native application needed to communicate with the new peripheral device. The server may then update a record in memory indicating the device has been paired, and the native application may store the key in persistent memory, e.g., in association with a network address, like a MAC address of the peripheral device.

When exchanging data, the peripheral device and central device may then encrypt their data with their respective keys, and the other device may use its respective key to decrypt the data. As a result, privacy of users may be protected when exchanging sensitive data about dependent individuals.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The illustrated components are depicted as discrete functional blocks, but embodiments are not limited to systems in which the functionality described herein is organized as illustrated. The functionality provided by each of the components may be provided by software or hardware modules that are differently organized than is presently depicted. For example, such software or hardware may be intermingled, conjoined, replicated, broken up, distributed (e.g., within a data center or geographically), or otherwise differently organized. The functionality described herein may be provided by one or more processors of one or more computers executing code stored on a tangible, non-transitory, machine-readable medium.

Figure 8:
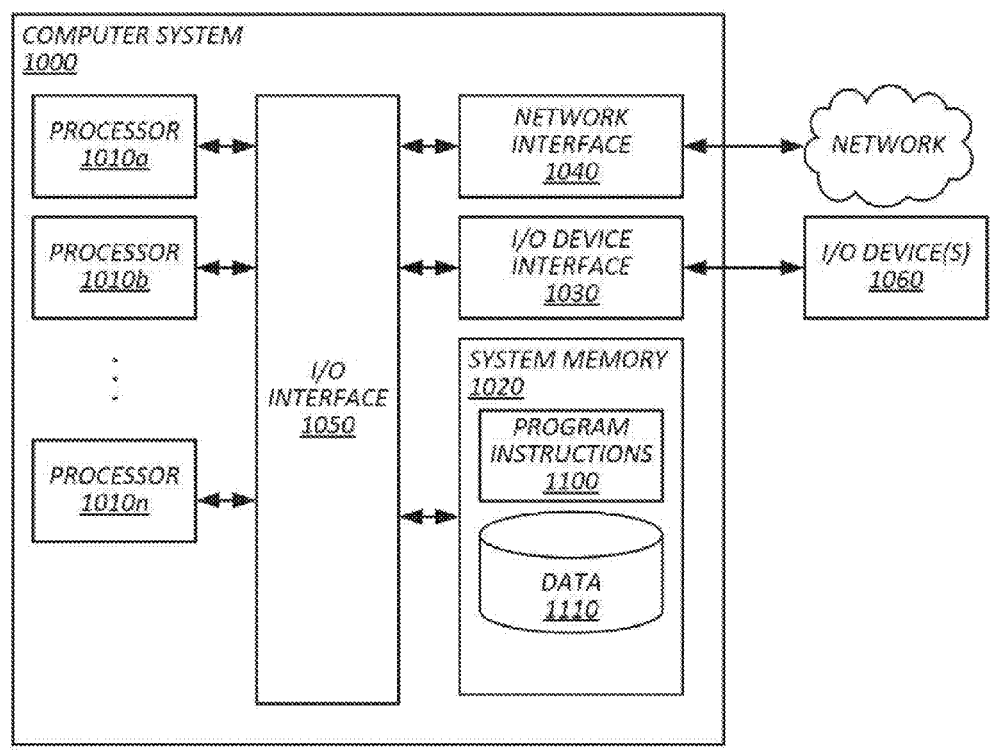
FIG. 8 is a diagram that illustrates an exemplary computing system 1000 in accordance with embodiments of the present techniques.

FIG. 8 is a diagram that illustrates an exemplary computing system 1000 in accordance with embodiments of the present technique. Various portions of systems and methods described herein, may include or be executed on one or more computer systems similar to computing system 1000. Further, processes and modules described herein may be executed by one or more processing systems similar to that of computing system 1000.

Computing system 1000 may include one or more processors (e.g., processors 1010a-1010n) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010a), or a multi-processor system including any number of suitable processors (e.g., 1010a-1010n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface may 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1100 or data 1110. Program instructions 1100 may be executable by a processor (e.g., one or more of processors 1010a-1010n) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium that may have program instructions stored thereon that are executable by a computer processor (e.g., one or more of processors 1010a-1010n) to cause the subject matter and the functional operations described herein. A memory (e.g., system memory 1020) may include a single memory device and/or a plurality of memory devices (e.g., distributed memory devices).

I/O interface 1050 may be configured to coordinate I/O traffic between processors 1010a-1010n, system memory 1020, network interface 1040, I/O devices 1060, and/or other peripheral devices. I/O interface 1050 may perform protocol, timing, or other data transformations to convert data signals from one component (e.g., system memory 1020) into a format suitable for use by another component (e.g., processors 1010a-1010n). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000 or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present invention may be practiced with other computer system configurations.

To mitigate the problems described herein, the applicants had to both invent solutions and, in some cases just as importantly, recognize problems overlooked (or not yet foreseen) by others in the field. Indeed, applicants wish to emphasize the difficulty of recognizing those problems that are nascent and will become much more apparent in the future should trends in industry continue as applicants expect. Further, because multiple problems are addressed, it should be understood that some embodiments are problem-specific, and not all embodiments address every problem with traditional systems described herein or provide every benefit described herein. That said, solutions to many of these problems are described above.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, third party content delivery networks may host some or all of the information conveyed over networks, in which case, to the extent information (e.g., content) is said to be supplied or otherwise provided, the information may provided by sending instructions to retrieve that information from a content delivery network.

The reader should appreciate that the present application describes several inventions. Rather than separating those inventions into multiple isolated patent applications, applicants have grouped these inventions into a single document because their related subject matter lends itself to economies in the application process. But the distinct advantages and aspects of such inventions should not be conflated. In some cases, embodiments address all of the deficiencies noted herein, but it should be understood that the inventions are independently useful, and some embodiments address only a subset of such problems or offer other, unmentioned benefits that will be apparent to those of skill in the art reviewing the present disclosure. Due to costs constraints, some inventions disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such inventions or all aspects of such inventions.

It should be understood that the description and the drawings are not intended to limit the invention to the particular form disclosed, but to the contrary, the intention is to cover all modifications, equivalents, and alternatives falling within the spirit and scope of the present invention as defined by the appended claims. Further modifications and alternative embodiments of various aspects of the invention will be apparent to those skilled in the art in view of this description. Accordingly, this description and the drawings are to be construed as illustrative only and are for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "an element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. It should also be noted that "information indicating the location of the moveable device with respect to a central unit" does not require the information to include or be based on the location of the central unit when the information is a signal received by the central unit, as things like signal strength can indicate location. Also "the location of the peripheral device breaching the location indicator threshold" need not be detected at the moment of breach. It is enough to determine it is beyond the threshold.

The present techniques will be better understood with reference to the following enumerated embodiments:

1. A wearable child-monitor system, the system comprising: a movable peripheral device associated with a user, the movable peripheral device, comprising: one or more sensors configured to generate output signals conveying information indicating the location of the moveable device with respect to a central unit; a tangible non-transitory machine readable media storing instructions that when executed by one or more processors of the central unit effectuate operations comprising: establish wireless communication between the movable peripheral device and the central unit; define monitoring settings to monitor the location of the movable peripheral device with respect to the central unit, wherein defining the monitoring settings include defining a predetermined location indicator threshold; send the defined monitoring settings to the movable peripheral device; determine information indicating the location of the moveable peripheral device with respect to the central unit based on the output signals from the one or more sensors; compare the information indicating the location of the moveable peripheral device with the defined monitoring settings; and generate an alert responsive to the information indicating the location of the peripheral device breaching the location indicator threshold.

2. The system of embodiment 1 wherein the operations comprising: sending the alert to the moveable peripheral device over the established wireless communication; and activating one or more output components of the movable peripheral device to implement the alert at the movable peripheral device.

3. The system of any of embodiments 1-2, wherein the wireless communication between the movable peripheral device and the central unit is a radio frequency communication.

4. The system of embodiment 3, wherein the radio frequency communication is a Bluetooth communication.

5. The system of any of embodiments 1-4, wherein the information indicating the location of the moveable peripheral device with respect to the central unit includes a Received Signal Strength Indication (RSSI).

6. The system of any of embodiments 1-5, further comprising: one or more stationary peripheral devices, wherein at least one stationary peripheral device is configured to communicate with other devices to relay communication between the central device and the wearable peripheral device, wherein the communication between the at least one stationary peripheral and the other devices is a radio frequency communication.

7. The system of embodiment 6, wherein the one or more stationary peripheral devices comprise a plurality of stationary peripheral devices in a localizing network.

8. The system of any of embodiments 1-7, further comprising: a second movable peripheral device tethered to the movable peripheral device, the second movable device configured to monitor the moveable peripheral device and the moveable peripheral device configured to monitor the second moveable peripheral device.

9. The system of any of embodiments 1-8, wherein the moveable peripheral device comprises a wearable band.

10. The system of any of embodiments 1-9, wherein the central device is a smartphone.

11. A monitoring system, the monitoring system comprising: one or more movable peripheral devices, wherein each one of the one or more movable peripheral devices is associated in memory of one or more central devices with an individual to be monitored; the one or more central devices, wherein each one of the one or more central devices is configured to monitor at least one peripheral device and trigger an alert when the respective movable peripheral device is detected in an inappropriate physical location based on defined alert settings; and one or more stationary peripheral devices configured to relay communication between the movable peripheral devices and the central devices.

12. The monitoring system of embodiment 11, wherein the one or more movable peripheral devices are used to monitoring one or more of: a child, a special needs individual, an elderly person, a person prone to wander, or a person with a mental disability.

13. A method of monitoring a location of a user, the user being associated with a movable peripheral device, the method comprising: generating, with one or more sensors, output signals conveying information indicating the location of the moveable device with respect to a central unit; establishing, with one or more hardware processors, wireless communication between the movable peripheral device and the central unit;

defining, with one or more hardware processors, monitoring settings for monitoring the location of the movable peripheral device with respect to the central unit, wherein defining the monitoring settings include defining a location indicator threshold; sending, with one or more hardware processors, the defined monitoring settings to the movable peripheral device; determining, with one or more hardware processors, information indicating the location of the moveable peripheral device with respect to the central unit based on the output signals from the one or more sensors; comparing, with one or more hardware processors, the information indicating the location of the moveable peripheral device with the defined monitoring settings; generating, with one or more hardware processors, an alert responsive to the information indicating the location of the peripheral device breaching the location indicator threshold.

14. The method of embodiment 13, further comprising: sending, with one or more hardware processors, the alert to the moveable peripheral device over the established wireless communication; and activating, with one or more hardware processors, one or more output components of the movable peripheral device to implement the alert at the movable peripheral device.

15. The method of any of embodiments 13-14, wherein the wireless communication between the movable peripheral device and the central unit is a radio frequency communication.

16. The method of embodiment 15, wherein the radio frequency communication is a Bluetooth communication.

17. The method of any of embodiments 13-16, wherein the information indicating the location of the moveable peripheral device with respect to the central unit includes a Received Signal Strength Indication (RSSI).

18. The method of any of embodiments 13-17, further comprising: monitoring the moveable peripheral device by a second moveable peripheral device tethered to the movable peripheral device; and monitoring the second moveable peripheral device by the moveable peripheral device.

19. The method of any of embodiments 13-18, wherein the moveable peripheral device is a wearable band.

20. The method of any of embodiments 13-19, wherein the central device is a smartphone

What is claimed is:

1. A wearable child-monitoring system, comprising:
a wearable smart band associated with a monitored person, the wearable smart band comprising:
 a band configured to secure the wearable smart band to a monitored person's body;
 a battery;
 a sensor configured to indicate whether the band has been removed from the monitored person's body;
 a microprocessor; and
 a radio configured to broadcast a radio-frequency signal, the radio-frequency signal encoding broadcast content with Gaussian frequency shift modulation;
a tangible non-transitory machine readable media storing instructions that when executed by one or more processors of a smartphone effectuate operations comprising:
 receiving a first instance of the radio-frequency signal broadcast from the wearable smart band;
 determining a perceived signal strength of the first instance of the radio-frequency signal broadcast from the wearable smart band;
 obtaining a first value from broadcast content of the first instance of the radio-frequency signal;
 determining that the monitored person is further than a first threshold distance from the smartphone based on both the perceived signal strength of the first instance of the radio-frequency signal broadcast from the wearable smart band and the first value obtained from broadcast content of the first instance of the radio-frequency signal;
 in response to the determination that the monitored person is further than the first threshold distance, causing the smartphone to emit a first alarm;
 receiving a second instance of the radio-frequency signal broadcast from the wearable smart band;
 obtaining a second value from broadcast content of the second instance of the radio-frequency signal, the second value indicating an output of the sensor configured to indicate whether the band has been removed; and
 in response to the second value, causing the smartphone to emit a second alarm, wherein:
the first value indicates a first vector of movement by the wearable smart band;
determining that the monitored person is further than the first threshold distance is based on the first vector;

the wearable smart band comprises a first inertial measurement unit (IMU) configured to sense the first vector;
the operations comprise:
obtaining a second vector of movement of the smartphone from a second IMU of the smartphone; and
determining a difference between the first vector of movement by the wearable smart band and the second vector of movement of the smartphone; and
determining that the monitored person is further than the first threshold distance is based on the difference between the first vector of movement by the wearable smart band and the second vector of movement of the smartphone.

2. The system of claim 1, wherein:
the wearable smart band comprises a water-immersion sensor;
the operations comprise:
receiving a third instance of the radio-frequency signal broadcast from the wearable smart band;
obtaining a third value from broadcast content of the third instance of the radio-frequency signal, the third value indicating a reading by the water-immersion sensor; and
in response to the third value, causing the smartphone to emit a third alarm.

3. The system of claim 1, wherein determining that the monitored person is further than the first threshold distance is based on the difference between the first vector of movement by the wearable smart band and the second vector of movement of the smartphone comprises:
combining a signal strength-based distance and an IMU-based distance.

4. The system of claim 1, the operations comprising:
determining, based on a perceived signal strength of an third instance of the radio-frequency signal at the smartphone, that the wearable smart band is within a threshold distance of the smartphone and, in response, calibrating an IMU integral of the smartphone, the wearable smart band, or both.

5. The system of claim 1, wherein the perceived signal strength is based on a Received Signal Strength Indication.

6. The system of claim 1, wherein:
the radio is configured to periodically broadcast the radio-frequency signal as a beacon; and
the operations comprise:
determining that a third instance of the radio-frequency signal broadcast from the wearable smart band has not been received; and
in response to determining that the third instance of the radio-frequency signal broadcast from the wearable smart band has not been received, causing the smartphone to emit a third alarm.

7. The system of claim 1, wherein:
the wearable smart band is configured to adjust broadcast strength of the radio-frequency signal based on distance from the smartphone.

8. The system of claim 1, wherein:
the first value indicates a broadcast signal strength of the first instance of the radio frequency signal.

9. The system of claim 1, wherein:
the wearable smart band comprises an accelerometer; and
the operations comprise:
receiving a fourth signal indicative of an impact sensed by the accelerometer of the wearable smart band; and
presenting information to a user of the smartphone in response to the impact.

10. The system of claim 1, wherein:
the first value is a value that distinguishes radio-frequency signals of the wearable smart band from radio-frequency signals of other devices transmitting in range of the smartphone.

11. The system of claim 1, wherein:
the wearable smart band comprises means for reducing power consumption.

12. The system of claim 1, wherein the operations comprise:
presenting a third alert with the smartphone by vibrating the smartphone in response to determining that the third alert is of a first level; and
presenting a fourth alert with the smartphone by emitting an audible alert with the smartphone in response to determining that the fourth alert is of a second level, different from the first level.

13. The system of claim 12, wherein:
the third alert corresponds to a second threshold distance between the wearable smart band and the smartphone;
the fourth alert corresponds to a third threshold distance between the wearable smart band and the smartphone; and
the third threshold distance is further than the second threshold distance.

14. The system of claim 1, wherein:
the wearable smart band is configured to emit an ultrasonic signal; and
the operations comprise receiving the ultrasonic signal with the smartphone and inferring a distance based on the ultrasonic signal.

15. The system of claim 1, wherein:
the wearable smart band comprises a pulse oximeter; and
the operations comprise:
receiving a third instance of the radio-frequency signal broadcast from the wearable smart band;
obtaining a third value from broadcast content of the third instance of the radio-frequency signal, the third value indicating an output of the pulse oximeter; and
in response to the third value, causing the smartphone to emit a third alarm.

16. A wearable child-monitoring system, comprising:
a wearable smart band associated with a monitored person, the wearable smart band comprising:
a band configured to secure the wearable smart band to a monitored person's body;
a battery;
a sensor configured to indicate whether the band has been removed from the monitored person's body;
a microprocessor; and
a radio configured to broadcast a radio-frequency signal, the radio-frequency signal encoding broadcast content with Gaussian frequency shift modulation;
a tangible non-transitory machine readable media storing instructions that when executed by one or more processors of a smartphone effectuate operations comprising:
receiving a first instance of the radio-frequency signal broadcast from the wearable smart band;
determining a perceived signal strength of the first instance of the radio-frequency signal broadcast from the wearable smart band;
obtaining a first value from broadcast content of the first instance of the radio-frequency signal;
determining that the monitored person is further than a first threshold distance from the smartphone based on both the perceived signal strength of the first instance of the radio-frequency signal broadcast from the wearable smart band and the first value obtained from broadcast content of the first instance of the radio-frequency signal;

in response to the determination that the monitored person is further than the first threshold distance, causing the smartphone to emit a first alarm;

receiving a second instance of the radio-frequency signal broadcast from the wearable smart band;

obtaining a second value from broadcast content of the second instance of the radio-frequency signal, the second value indicating an output of the sensor configured to indicate whether the band has been removed; and in response to the second value, causing the smartphone to emit a second alarm, wherein the operations comprise:

inferring that the wearable smart band is within a second threshold distance of the smartphone; and in response to the inference, adjusting an integral of inertial-measurement unit readings to reduce an effect of drift in determining that the monitored person is further than the first threshold distance from the smartphone.

17. The system of claim 16, wherein:
the wearable smart band comprises a water-immersion sensor;
the operations comprise:
receiving a third instance of the radio-frequency signal broadcast from the wearable smart band;
obtaining a third value from broadcast content of the third instance of the radio-frequency signal, the third value indicating a reading by the water-immersion sensor; and
in response to the third value, causing the smartphone to emit a third alarm.

18. The system of claim 16, wherein:
the first value indicates a first vector of movement by the wearable smart band;
determining that the monitored person is further than the first threshold distance is based on the first vector.

19. The system of claim 16, wherein determining that the monitored person is further than the first threshold distance is based on the difference between the first vector of movement by the wearable smart band and the second vector of movement of the smartphone comprises:
combining a signal strength-based distance and an IMU-based distance.

20. The system of claim 16, the operations comprising:
determining, based on a perceived signal strength of an third instance of the radio-frequency signal at the smartphone, that the wearable smart band is within a threshold distance of the smartphone and, in response, calibrating an IMU integral of the smartphone, the wearable smart band, or both.

21. The system of claim 16, wherein the perceived signal strength is based on a Received Signal Strength Indication.

22. The system of claim 16, wherein:
the radio is configured to periodically broadcast the radio-frequency signal as a beacon; and the operations comprise:
determining that a third instance of the radio-frequency signal broadcast from the wearable smart band has not been received; and
in response to determining that the third instance of the radio-frequency signal broadcast from the wearable smart band has not been received, causing the smartphone to emit a third alarm.

23. The system of claim 16, wherein:
the wearable smart band is configured to adjust broadcast strength of the radio-frequency signal based on distance from the smartphone.

24. The system of claim 16, wherein:
the first value indicates a broadcast signal strength of the first instance of the radio frequency signal.

25. The system of claim 16, wherein:
the wearable smart band comprises an accelerometer; and
the operations comprise:
receiving a fourth signal indicative of an impact sensed by the accelerometer of the wearable smart band; and
presenting information to a user of the smartphone in response to the impact.

26. The system of claim 16, wherein:
the first value is a value that distinguishes radio-frequency signals of the wearable smart band from radio-frequency signals of other devices transmitting in range of the smartphone.

27. The system of claim 16, wherein:
the wearable smart band comprises means for reducing power consumption.

28. The system of claim 16, wherein the operations comprise:
presenting a third alert with the smartphone by vibrating the smartphone in response to determining that the third alert is of a first level; and
presenting a fourth alert with the smartphone by emitting an audible alert with the smartphone in response to determining that the fourth alert is of a second level, different from the first level.

29. The system of claim 28, wherein:
the third alert corresponds to a second threshold distance between the wearable smart band and the smartphone;
the fourth alert corresponds to a third threshold distance between the wearable smart band and the smartphone; and
the third threshold distance is further than the second threshold distance.

30. The system of claim 16, wherein:
the wearable smart band is configured to emit an ultrasonic signal; and
the operations comprise receiving the ultrasonic signal with the smartphone and inferring a distance based on the ultrasonic signal.

31. The system of claim 16, wherein:
the wearable smart band comprises a pulse oximeter; and
the operations comprise:
receiving a third instance of the radio-frequency signal broadcast from the wearable smart band;
obtaining a third value from broadcast content of the third instance of the radio-frequency signal, the third value indicating an output of the pulse oximeter; and
in response to the third value, causing the smartphone to emit a third alarm.

* * * * *